United States Patent [19]
Suzuki et al.

[11] Patent Number: 6,084,990
[45] Date of Patent: Jul. 4, 2000

[54] IMAGE READING AND DISPLAYING APPARATUS

[75] Inventors: Kiyoshi Suzuki, Yamatokoriyama; Toshio Isoe, Tenri; Mami Iida, Nara, all of Japan

[73] Assignee: Sharp Kabushiki Kaisha, Osaka, Japan

[21] Appl. No.: 08/926,439

[22] Filed: Sep. 10, 1997

[30] Foreign Application Priority Data

Sep. 10, 1996 [JP] Japan .................................... 8-239430

[51] Int. Cl.⁷ .............................. G06K 7/00; G06K 9/20; G06K 9/22; H04N 1/04
[52] U.S. Cl. ........................... 382/312; 382/313; 358/497
[58] Field of Search .................................... 382/312–314, 382/309, 112, 189; 358/497, 527; 345/84, 104, 207; 361/681; 348/231, 284

[56] References Cited

U.S. PATENT DOCUMENTS 5,550,938  8/1996  Hayakawa et al. ...................... 382/313
5,659,379  8/1997  Morimoto ............................... 349/149

*Primary Examiner*—Leo H. Boudreau
*Assistant Examiner*—Dmitry A. Novik
*Attorney, Agent, or Firm*—Nixon & Vanderhye, P.C.

[57] ABSTRACT

An object of the invention is to easily and firmly read an image and to reduce power consumption. An image reading and displaying apparatus comprises a scanner for reading an image of a document arranged on the side of a read face where photocells are arranged in a matrix form, to output image information, a RAM for storing the image information from the scanner and a display device of a light transmitting type such including a display face for displaying the image information stored in RAM, the display device being such arranged that a back face of the display face contacts with a back face of the read face. Since the back face of the display face is arranged so as to contact the back face of the read face, an operator can confirm the image to be read, whereby the image can be read with certainty.

18 Claims, 12 Drawing Sheets

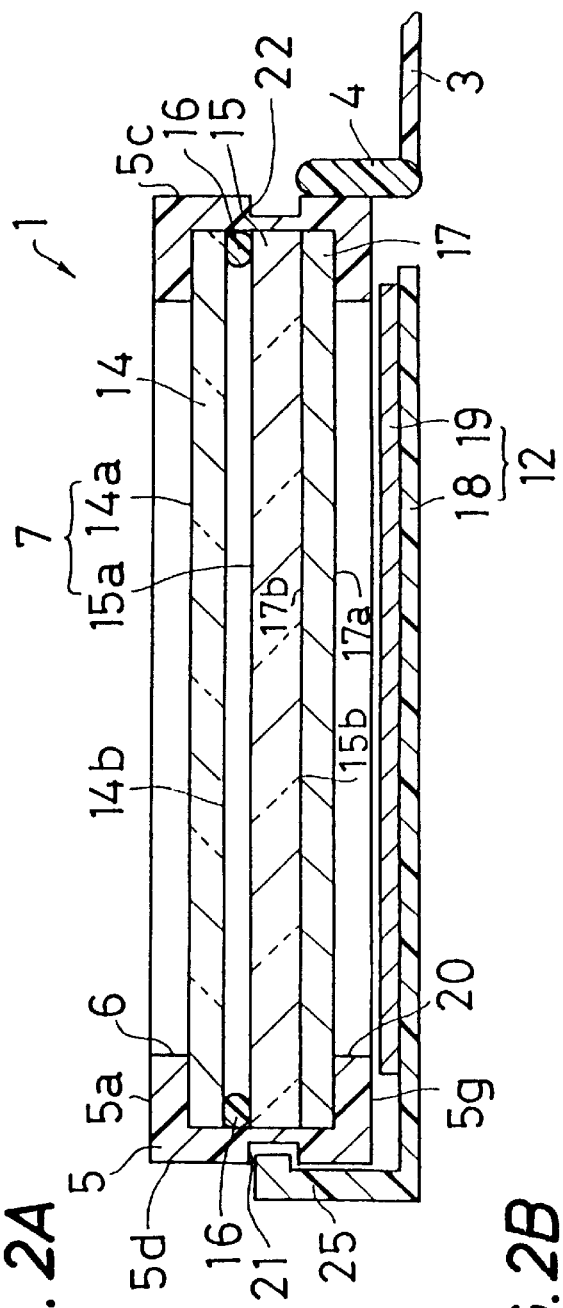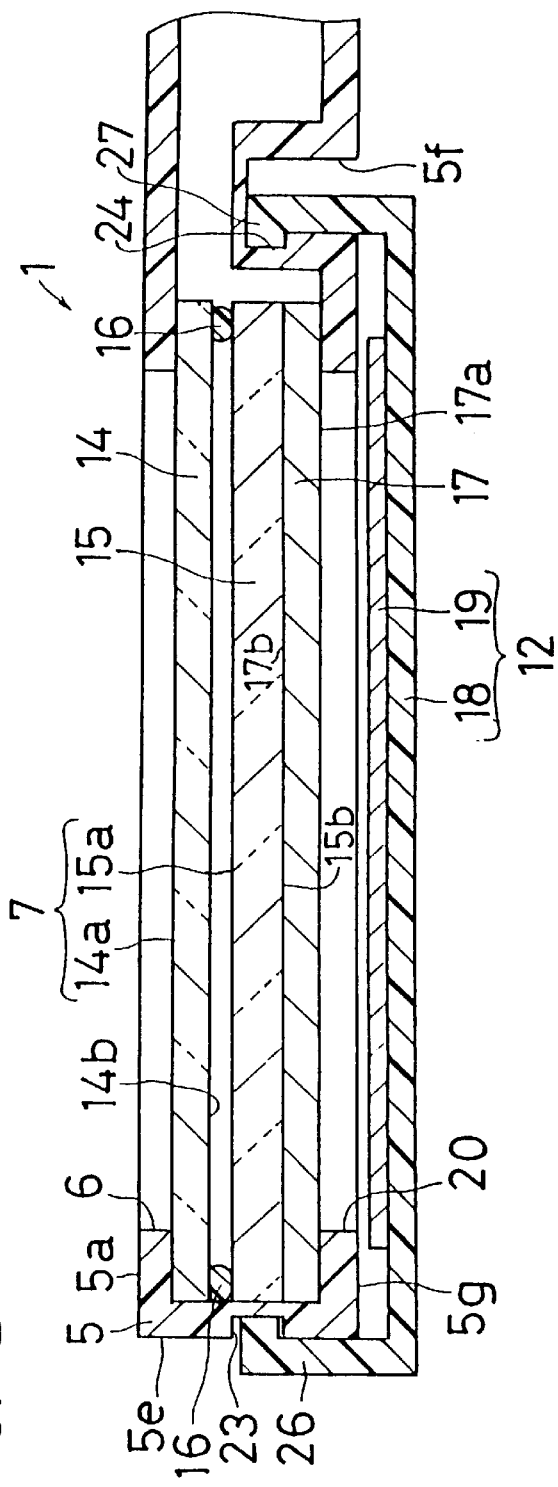
FIG. 2A
FIG. 2B

IMAGE READING AND DISPLAYING APPARATUS

BACKGROUND OF THE INVENTION

1. Field of the Invention

The present invention relates to an image reading and displaying apparatus which is portable and capable of simultaneously reading and visually observing images.

2. Description of Related Art

There has been disclosed an image reading apparatus that is conventional technology in, for example, Japanese Unexamined Patent Publication JP-A 3-276250 (1991). According to that publication, an image on an object is inputted by a scanner which is manually moved, for display and storage. Specifically, a display is provided on a top face of a main body of an image reading apparatus. Further, one side face of the main body is a scanner face which constitutes a so-called line sensor. In order to read the image, the scanner face is pushed against an object on which an image is drawn and manually moved (scanned) on the object in contact with the object, while the main body of the image reading apparatus is held by hand. The read image is binarized to be displayed and stored. According to the art of the publication, a light source is provided, from which light is irradiated on the object. The light reflected from the object enters the line sensor via an optical system.

According to the art of the publication, since the display is provided on the top face of the main body of the image reading apparatus and an image is read by the side face of the main body, it is difficult to confirm the read image while scanning. Accordingly, an error in reading is apt to be noticed after finishing the reading operation and the reading operation must be carried out again. Also, the light source is indispensable for reading images which gives rise to an increase in power consumption. Furthermore, scanning accuracy is deteriorated since the main body of the image reading apparatus is manually moved to read one image.

Further, in the case where an image of a large area which requires an operation ranging in plural steps is read, the scanning must be performed in due order, for example, from an upper scanning region, such that a part of a scanning region overlaps a part of the next region. Thus, many restrictions are imposed on the scanning operation with the result that the apparatus is inconvenient to use. Additionally since data must be read overlappingly, a large capacity of memory is needed.

SUMMARY OF THE INVENTION

It is an object of the invention to provide an image reading and displaying apparatus capable of reading images firmly and easily and capable of reducing power consumption.

The present invention provides an image reading and displaying apparatus comprising:

reading means having a reading portion in which photocells are arranged in a matrix form, for reading an image of a document arranged on a side of a reading face of the reading portion, to output image data;

storing means for storing the image data from the reading means; and displaying means of a light transmitting type including a display face for displaying the image data stored in the storing means, the displaying means being arranged such that a back face of the display face contacts a back face of the reading face.

According to the aspect of the present invention, the image data read by the reading means is stored in the storing means and displayed by the displaying means. The apparatus is arranged such that the back face of the display face contacts the back face of the reading face and therefore, the image of the document arranged on the side of the reading face in the reading operation, can be visually observed via the reading means and the displaying means. Therefore, an operator can confirm the image to be read whereby the image can firmly be read.

Further the invention is characterized in that a light source for optically irradiating the displaying means is detachably arranged on the side of the reading face of the reading means.

According to the invention, the light source is arranged on the side of the reading face and light from the light source is irradiated on the displaying means whereby bright display of a light transmitting type is feasible. Meanwhile by detaching the light source from the reading face side, the image can be read by reflecting light from external side by the surface of the document and making a reflected light incident on the reading portion. In reading the image external light can be utilized whereby power consumption can be reduced.

Further, the invention is characterized in that the light source is arranged movably to the side of the display face of the displaying means so that light can be irradiated from the back face of the reading means.

According to the invention, the light source is detached from the side of the reading face of the reading means to be arranged on the side of the display face of the displaying means when external light is deficient and light is irradiated from the back face of the reading means whereby light from the light source is reflected by the surface of the document and the reflected light is allowed to enter the reading portion whereby an image can be read. Accordingly, the light source serves as both of a back light for display and a light irradiating device for the reading face.

Further the invention is characterized in that the display face and the reading face have substantially the same size and the light source is a planar light source having a light emitting face substantially having the same size as that of the display face and the reading face.

According to the invention, by using the planar light source, uniformity of the brightness in the display face and uniformity of an in-plane darkness in reading can be promoted.

Further the invention is characterized in that featured in further including detecting means for detecting that the light source is arranged on the side of the display face and turn on of the light source is designated and light source controlling means for controlling a time period of turning on the light source in response to an output from the detecting means.

According to the invention, when it is detected that the light source is arranged on the side of the display face and, for example, a specific operation is carried out by an operator, the light source is turned on. Accordingly, the light source can firmly be turned on in reading images by utilizing light of the light source and further, even when the light source is detached, it is not turned on so far as it is arranged on the side of the display face and accordingly, power consumption can be reduced.

Further the invention is characterized in that the image reading and displaying apparatus comprises:

first designating means for designating that an image of a document larger than the reading face is divided into a plurality of regions to be read; and display controlling means in response to an output from the first designating means for editing the image data stored in the storing means to provide the image data to the displaying means so that an image of one end in one region read by the reading means is displayed at another end opposed to the one end, and the image reading and displaying apparatus or the document is moved such that the image of the document is continuously connected to the image displayed on the display face to read an image of the region adjacent to the region read by the reading means.

According to the invention, in the case where an image having a large area is read by continuously connecting portions of the image, the reading face is registered to the document such that an image contiguous to a read image is continuously connected to an image displayed at one end of the display face, whereby the image having a large area can be easily read.

Further the invention is characterized in that the image reading and displaying apparatus comprises:

second designating means for designating an end of the region read by the reading means to which end a portion of the image of the document is to be continuously connected, and the display controlling means edits the image data stored in the storing means to provides the image data to the displaying means such that an image at the end designated by the second designating means, of the region read by the reading means, is displayed at another end opposed to the end designated by the second designating means, in response to an output from the first designating means.

According to the invention, in the case where an image having a large area is read by continuously connecting portions of the image, the reading face is registered to the document such that the image adjacent to the end designated by the second designating means of the read image, is continuously connected to the image displayed at the end of the display face whereby the ends to be connected together are designated and the image having a large area can be easily read.

Further the invention is characterized in that the image reading and displaying apparatus comprises:

a rod-like member erectable orthogonally to a center portion of the display face;

time measuring means for measuring time; and direction providing means wherein a shadow formed on the display face in erecting the rod-like member orthogonally to the center portion of the display face, is read by the reading means and a direction is provided from a position of the shadow in a face with a reference of the center portion of the display face and time measured by the time measuring means when the shadow is read, and wherein the displaying means displays the direction provided by the direction providing means on the display face.

According to the invention, a function as a direction magnet is added and photocells can be effectively used other than for reading images.

Further the invention is characterized in that the image reading and displaying apparatus comprises:

third designating means for designating display of the direction provided by the direction providing means, and wherein the displaying means displays the provided direction in response to an output from the third designating means.

According to the invention, the provided direction when the display thereof is designated by the third designating means can be displayed in the case where the function of a direction magnet is executed and accordingly, a necessary direction can accurately be shown.

BRIEF DESCRIPTION OF THE DRAWINGS

Other and further objects, features, and advantages of the invention will be more explicit from the following detailed description taken with reference to the drawings wherein:

FIG. 2A is a sectional view taken from a line I—I of FIG. 1A and FIG. 2B is a sectional view taken from a line II—II of FIG. 1A;

DETAILED DESCRIPTION OF THE PREFERRED EMBODIMENT

Reference is now made to the drawings for illustrating preferred embodiments of the invention.

Figure 1A:
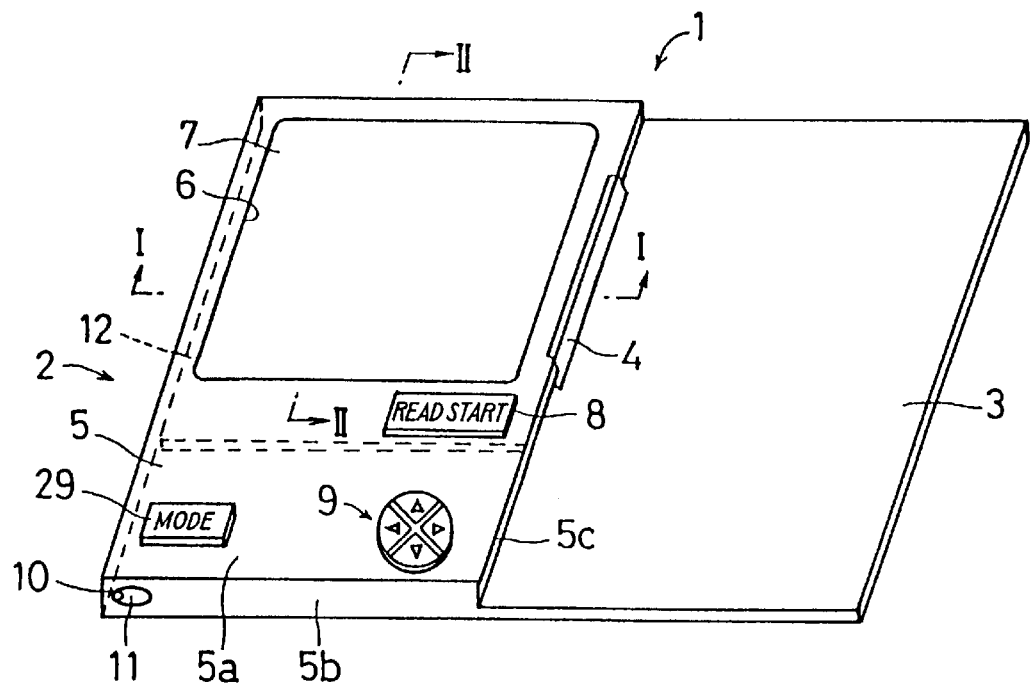
FIG. 1A is a perspective view showing an outlook of an image reading and displaying apparatus 1 in displaying an input and FIG. 1B is a perspective view showing the outlook of the image reading and displaying apparatus 1 in reading an image.
Figure 1B:
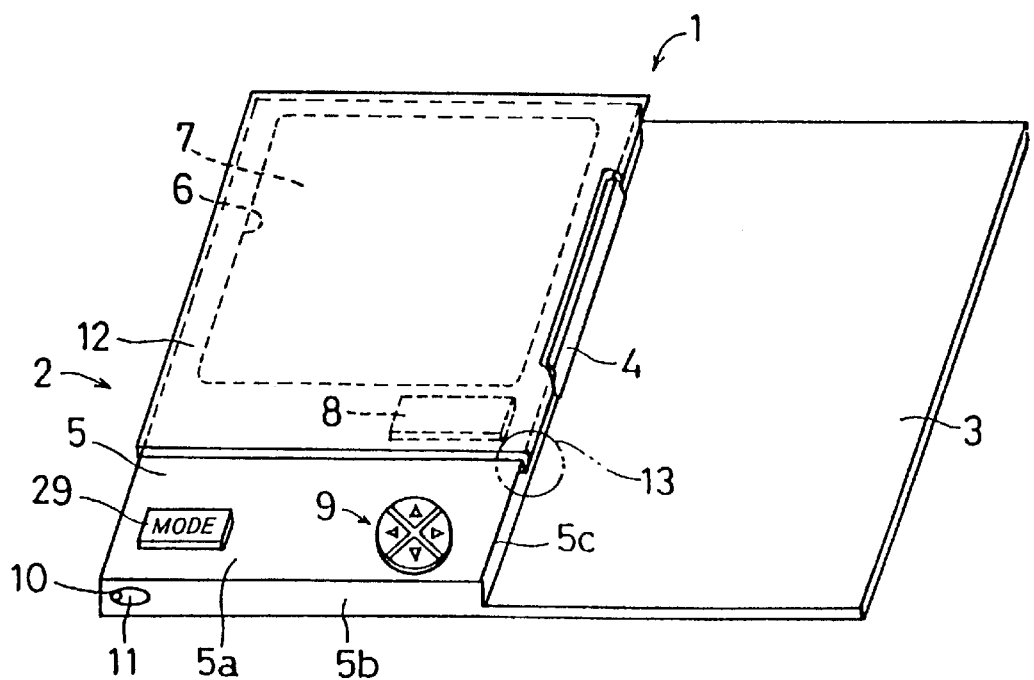

FIGS. 1A and 1B are perspective views showing an image reading and displaying apparatus 1 according to an embodiment of the invention. FIG. 1A shows apparatus 1 in a state of inputting and displaying an image and FIG. 1B shows apparatus 1 in a state of reading an image. FIG. 2A is a sectional view taken from a line I—I of FIG. 1A and FIG. 2B is a sectional view taken from a line II—II of FIG. 1A. The image reading and displaying apparatus 1 according to the embodiment can input and display a handwritten input and can read an image, and includes a main body 2 of the image reading and displaying apparatus (hereinafter, referred to also as "main body") and a lid 3. As shown in FIG. 2A and FIG. 2B, the main body 2 includes a cabinet 5 incorporating a tablet 14, a display device 15, a scanner 17 and the like. An input display face 7 is exposed from an opening 6 formed on a surface 5a of the cabinet 5. A read face 17a for reading an image is exposed from an opening 20 formed on a rear face 5g.

A read start button 8 and a cursor button 9 (having left and right and the up and down directions) and a mode button 29 are installed on the surface 5a. An insertion hole 10 for storing an input pen 11 used in the handwritten input or the input display face 7, is formed in main body 2 on one face 5b of the cabinet 5a.

The lid 3 is pivotably attached by a hinge 4 to a vicinity of a side face 5c different from the side face 5b. For example, in carrying the image reading and displaying apparatus 1, the input display face 7 can be prevented from being damaged by covering the surface 5a with the lid 3.

As shown in FIG. 2A and FIG. 2B, a rear face 14b opposed to an input face 14a of the tablet 14 and a display face 15a of the display device 15, are spaced apart from each other by a spacer 16 at a predetermined interval. The tablet 14 and the display device 15 are integrally formed and the tablet 14 is arranged on the side of the surface 5a. The tablet 14 has a light transmitting performance and the input display face 7 comprising the input face 14a and the display face 15a is exposed through the opening 6. Further, display device 15 of a light transmitting type. A rear face 15b opposed to the display face 15a of the display device 15 is arranged to contact a rear face 17b opposed to the read face 17a for reading an image of the scanner 17. Accordingly, the read face 17a is exposed through the opening 20.

The main body 2 is provided with a light source portion 12. The light source portion 12 is used at least as a back light for the of display and is used as a light source for assisting light when an amount of external light in reading is deficient. The light source portion 12 is slidably attached to the cabinet 5. Except in displaying an input and carrying the apparatus, the light source portion 12 is arranged on the side of the read face 17a as shown by FIG. 1A, FIGS. 2A and 2B. Meanwhile, it is arranged on the side of the input display face 7 as shown by FIG. 1B in reading an image when an amount of external light is deficient.

Incidentally, when a sufficient amount of external light is provided, it is sufficient to merely move the light source portion 12 such that the read face 17a is opened.

The light source portion 12 is composed of a light source 19 arranged on a support member 18. The light source 19 is preferably formed by a planar light source such as an EL (electroluminescence) panel or the like. Grooves 21 through 24 are formed in the cabinet 5 to movably fix the support member 18 as described above. The groove 21 is formed at a side face 5d of the cabinet 5 opposed to the side face 5c and the groove 22 is formed at the side face 5c. The groove 23 is formed at a side face 5e opposed to the side face 5b and a recess 5f is formed along the side faces 5b and 5e which is disposed between the side faces 5b and 5e of the cabinet 5 at a position at least exceeding from the input display face 7 and the read face 17a in a direction from the side face 5e and the groove 24 is formed at the recess 5f. The grooves 21 and 22 are in parallel with each other and the grooves 23 and 24 are formed to be orthogonal to the grooves 21 and 22.

An engaging portion 25 for engaging with the groove 21 when the light source portion 12 is arranged on the side of the read face 17a and engaging with the groove 22 when it is arranged on the side of the input display face 7, is formed at the support member 18 and attaching portions 26 and 27 are formed there for engaging with the grooves 23 and 24. Accordingly, the light source portion 12 is movable as follows.

Figure 3A:
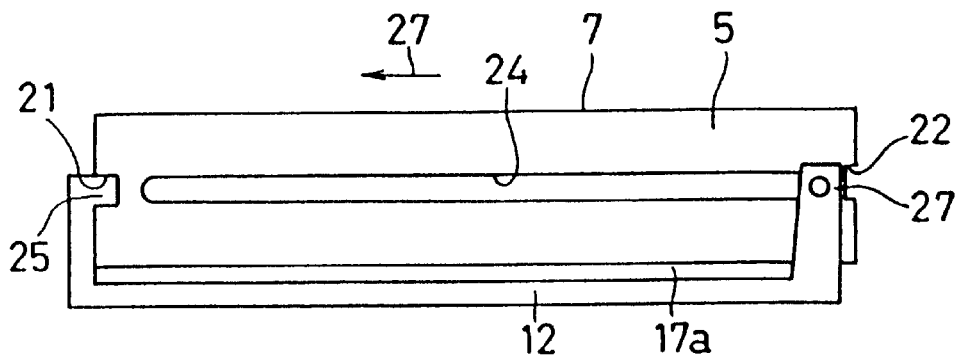
FIGS. 3A through 3C are side views of a main body 1 for explaining a method of moving a light source portion 12.
Figure 3B:
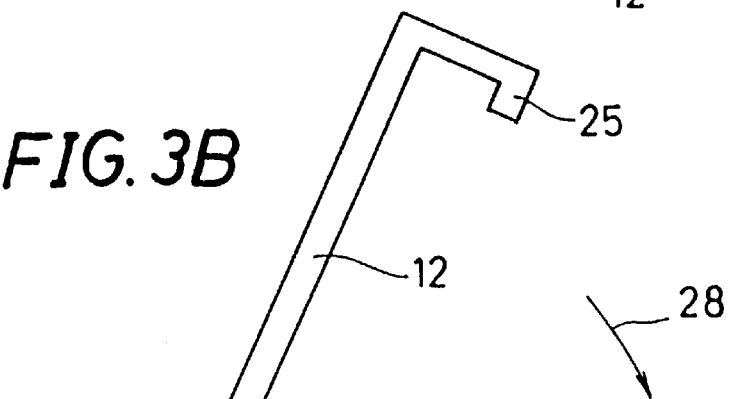
Figure 3B:
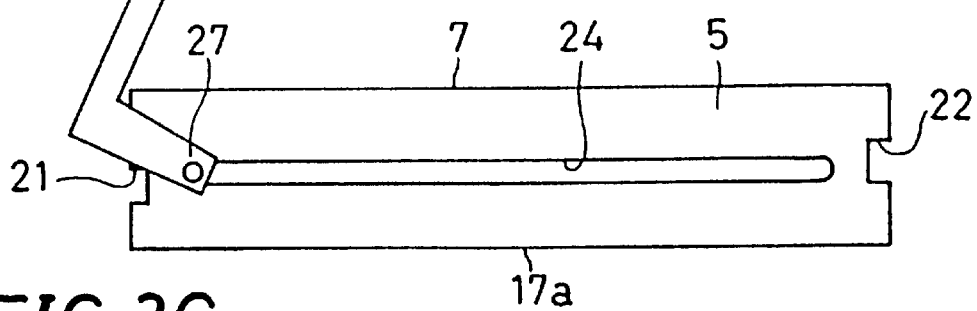
Figure 3C:
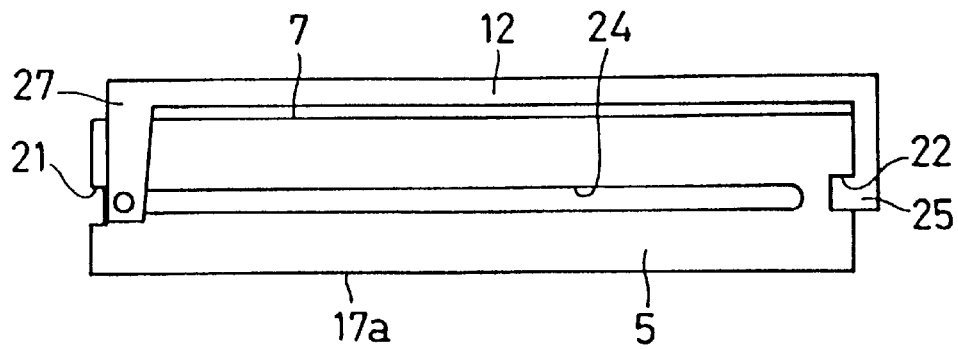

FIG. 3A through FIG. 3C are side views enlarging a portion of the main body 1 for explaining the moving operation of the light source portion 12. In the case of input display, as shown by FIG. 3A, the engaging portion 25 is engaged with the groove 21 whereby the light source portion 12 is arranged on the side of the read face 17a. In reading an image in the case where external light is deficient or the like, the light source portion 12 is moved in the left direction of the drawing along the grooves 23 and 24, successively, as shown by FIG. 3B, the light source portion 12 is pivoted in a direction of 28 with the attaching portion 27 as a fulcrum and further, as shown by FIG. 3C, the engaging portion 25 is engaged with the groove 22 whereby the light source portion 12 is arranged on the side of the input display face 7. By reversely carrying out such an operation, the light source portion 12 is arranged from the side of the input display face 7 to the side of the read face 17a. When the amount of external light is sufficient, the read face 17a can be exposed by slidably moving the light source portion 12 in the left direction of the drawings along the grooves 23 and 24.

Incidentally, the engagement and release of the engaging portion 25 to and from the grooves 21 and 22 can easily be realized by constructing the cabinet 5 or the support member 18 by synthetic resin or the like and by exerting a force in a direction of approaching the support member 18 to the cabinet 5 and a direction of separating the support member 18 therefrom.

Figure 4:
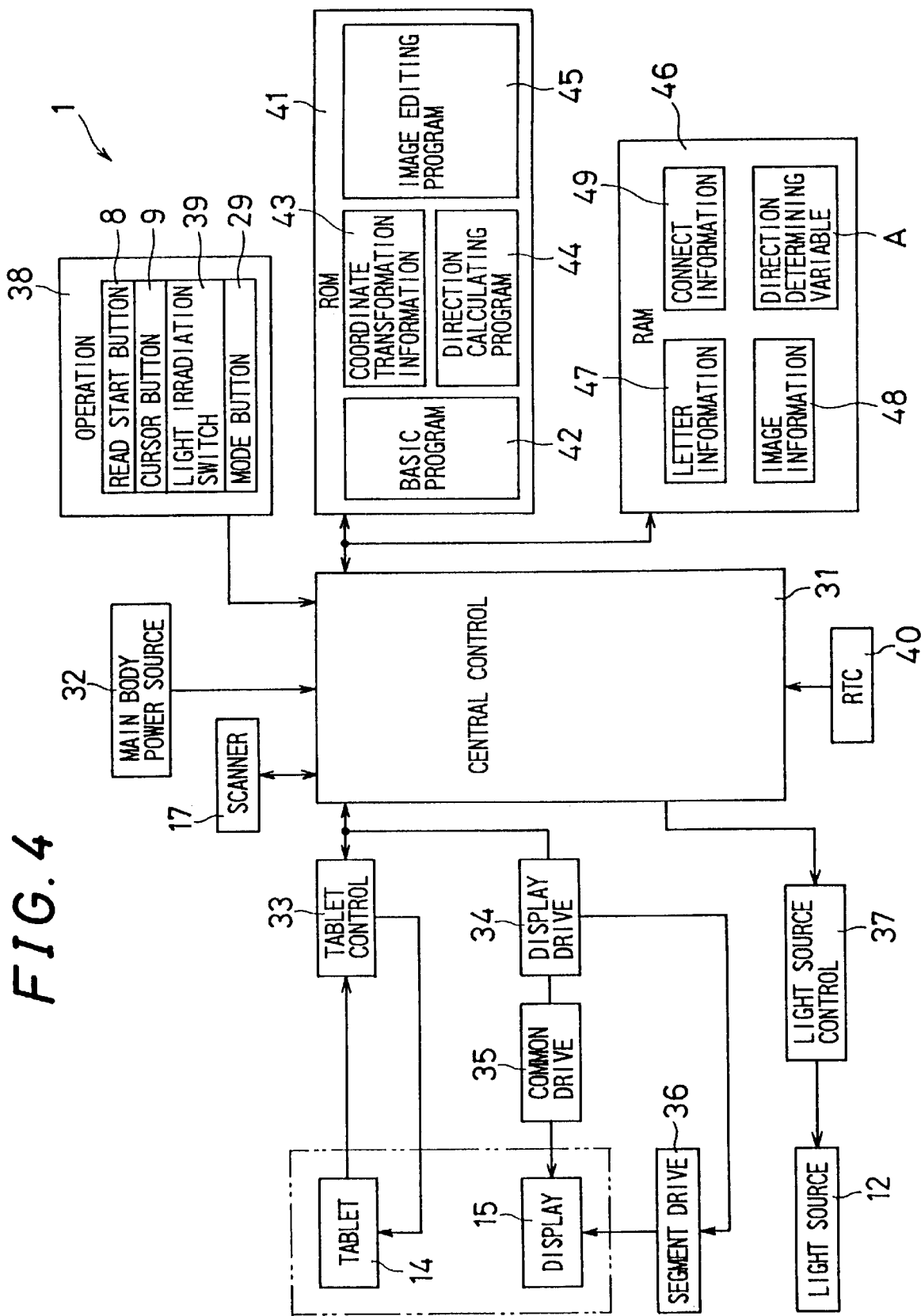
FIG. 4 is a block diagram showing an electric constitution of the image reading and displaying apparatus 1.

FIG. 4 is a block diagram showing electric constitution of the image reading and displaying device 1. The image reading and displaying device 1 includes (in addition to the light source portion 12) the tablet 14, the display device 15 and the scanner 17, a central control unit 31, a main body power source 32, a tablet control unit 33, a display drive 34, a common drive circuit 35, a segment drive circuit 36, a light source control unit 37, an operating portion 38, an RTC (Real Time Clock) 40, a ROM (Read Only Memory) 41 and a RAM (Random Access Memory) 46. Additionally, the image reading and displaying apparatus 1 may include a communication portion and an interface using an infrared ray or the like.

The central control unit 31 is realized by, for example, CPU (Central Processing Unit) and controls the operation of the total of the image reading and displaying apparatus 1 by various instructions. The main body power source 32 supplies the central control unit 31 with power source voltage for driving various constituent members constituting the image reading and displaying apparatus 1.

The tablet 14 can be realized by a well-known tablet where two transparent sheet substrates each having transparent electrodes in, for example, a strip like shape are arranged such that the transparent electrodes of the substrates are orthogonal to each other and arranged on the inner sides of the substrates. When the input face 14a is not pushed down by a finger or the input pen 11, that is, in the normal time where no instruction is issued, the substrates stay arranged via spacers in a small projection shape that are regularly arranged such that the transparent electrodes of one substrate do not contact the transparent electrodes of the other substrate and when an instruction is issued by pushing down the input face 14a by a finger or the input pen 11, the transparent electrodes of the respective substrates are brought into contact with each other. The tablet control unit 33 controls the operation of the tablet 14 and takes out instructed coordinate information. Therefore, the tablet control unit 33 is connected to the transparent electrodes installed to the respective substrates and detects an instructed coordinate point by detecting a partial pressure value caused by the contact.

The display device 15 can be realized by a well-known display device, for example, an LCD (Liquid Crystal Device) where a matrix type display system of a thin plate type capable of displaying letters, figures and the like is used. The display drive 34 stores positions of respective dots of a matrix as a bit map and supplies signals of display to the common drive circuit 35 and the segment drive circuit 36 as necessary in order to control the operation of the display device 15.

Further, the input face 14a of the tablet 14 is selected to have a size at least covering the display face 15a of the display device 15. Also, by synchronizing the coordinate information of the display device 15 with the coordinate information of the tablet 14, information selected by an operator based on the information displayed on the display device 15 can be detected.

The light source portion 12 is preferably a planar light source and realized by, for example, an EL panel. The light source control unit 37 controls operations of turning on and off the light source portion 12. The light source portion 12 may be realized by a fluorescent lamp or a member plated with a luminous paint other than an EL panel.

The operating portion 38 includes the read start button 8 for instructing start of reading, the cursor button 9 used in executing processing mentioned later, the mode button 29 for selecting modes executed by the image reading and displaying apparatus 1 and a light irradiation switch 39, mentioned later. RTC 40 measures time and supplies current date and time to the central control unit 31.

ROM 41 stores a basic program 42 showing the operation of, for example, the central control unit 31, a coordinate transformation information 43 for transforming to coordinates corresponding to the coordinate point detected by the tablet control unit 33, a direction calculating program 44 for calculating a direction, mentioned later, and an image editing program 45 for editing an image read by the scanner 17.

RAM 46 stores letter information 47, for example, inputted by an operator by handwriting, image information 48 read by the scanner 17, connect information 49 including surrounding information in connecting images, mentioned later and a direction determining variable A for determining a direction of connection designated by an operator.

Figure 5:
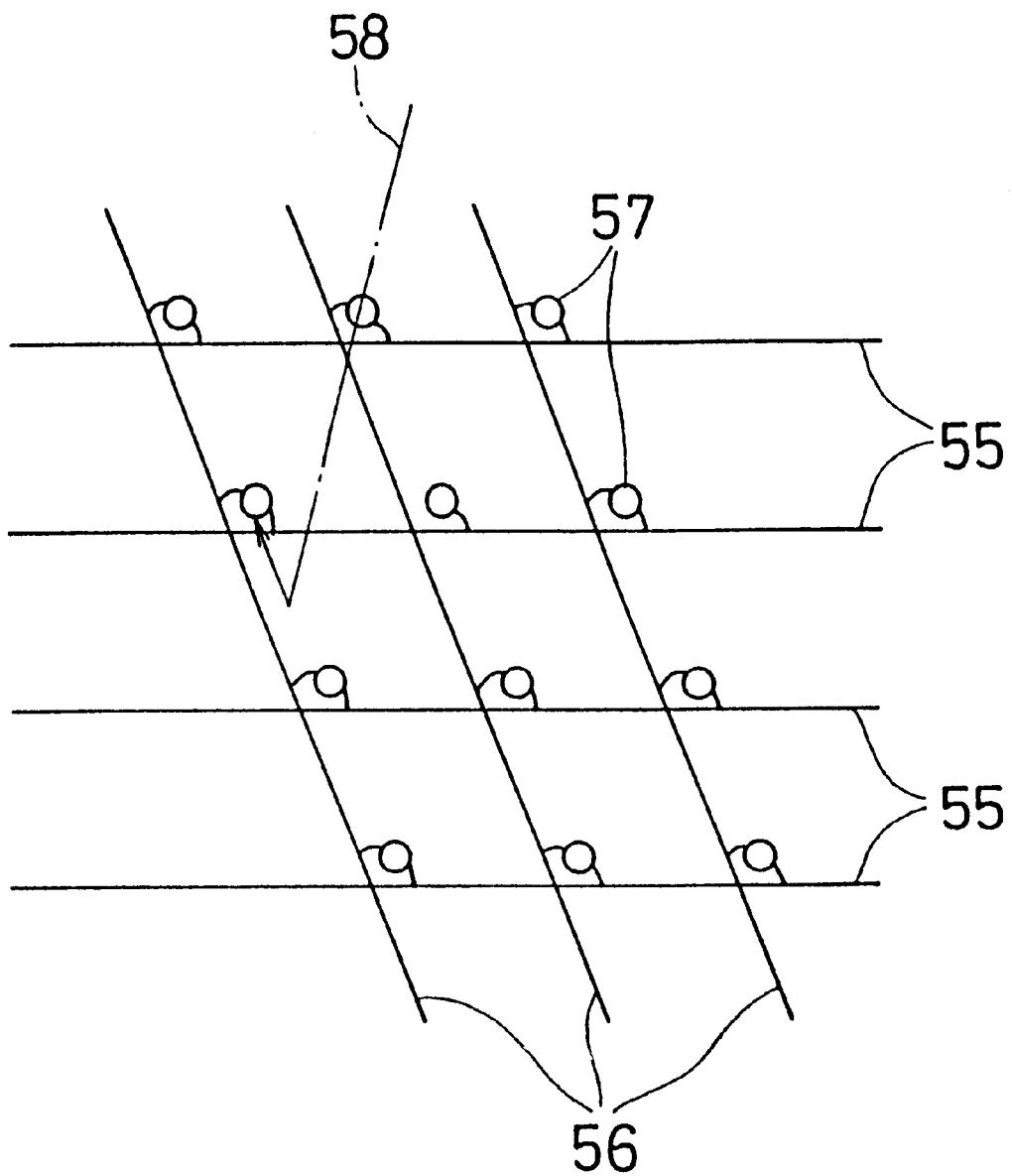
FIG. 5 is a circuit diagram showing a scanner 17.

FIG. 5 is a circuit diagram showing the scanner 17 used in the invention. The scanner 17 includes a plurality of strip-like electrodes 55 arranged in parallel with each other at intervals, a plurality of strip-like electrodes 56 arranged similarly in parallel with each other at intervals and photocells 57 constructed of semiconductor layers arranged between the strip-like electrodes 55 and 56. The photocells 57 are arranged in a matrix at intervals of, for example, 200 DPI (dot/inch). The strip-like electrodes 55 and 56 are formed by vapor deposition of, for example, aluminum on predetermined substrates.

In reading an image, incident light 58 from outside or from the light source portion 12 reaches a document arranged on the side of the read face 17a by passing through gaps among the strip-like electrodes 55 and 56. The light is absorbed or reflected by an image drawn on the document. When the reflected light is incident on the photocells 57, currents are made to flow among the strip-like electrodes 55 and 56 whereby the image drawn on the document can be read by detecting voltages among the strip-like electrodes 55 and 56.

Incidentally, the strip-like electrodes 55 and 56 have light reflecting performance and accordingly, they function as reflecting plates of a semitransmitting type of the display device. Accordingly, when a sufficient amount of external light is provided, a reflecting type display can be executed, and when a sufficient amount of external light is not provided, a transmitting type display using the light source portion 12 can be executed. Voltage conversion is carried out by the photocells 57 in displaying an image and power consumption can be reduced by feeding back the converted power source voltage.

The light irradiation switch 39 is provided, for example, at a vicinity of a region 13 surrounded by two-dotted chain lines in FIG. 1B. That is, it is installed at a vicinity of the side face 5c of the cabinet 5. Specifically, it is installed as illustrated by FIG. 6A and FIG. 6B.

Figure 6A:
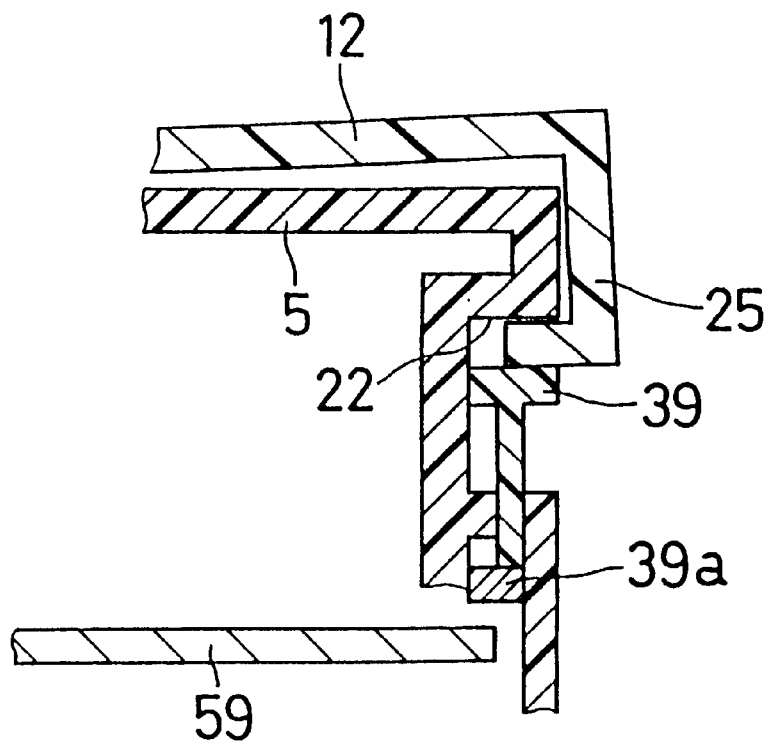
FIGS. 6A and 6B are sectional views enlarging a light irradiation switch 39.
Figure 6B:
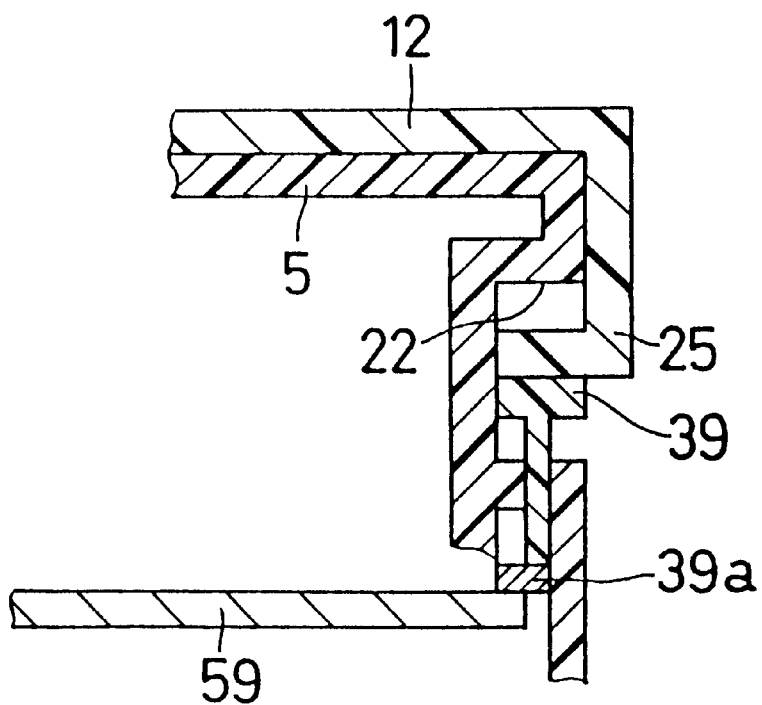

FIG. 6A and FIG. 6B are sectional views enlarging the light irradiation switch 39. The switch 39 is installed at the groove 22 formed at the side face 5c to project on the side of the input display face 7, or in the upward direction according to the embodiment. As shown by FIG. 6A, when the light source portion 12 is arranged on the side of the input display face 7, the engaging portion 25 is brought into contact with the switch 39. Further, when the engaging portion 25 is completely engaged with the groove 22, the switch 39 is pushed down as shown by FIG. 6B. Further, a conductive portion 39a attached to the switch 39 at the inside of the cabinet 5 is brought into contact with a predetermined terminal of a printed circuit board similarly incorporated at the inside of the cabinet 5 and an instruction of starting light irradiation by pushing down the switch 39 is transmitted to the central control unit 31 mounted on, for example, a printed circuit board 59. In response thereto, the central control unit 31 instructs the light irradiation to the light source control unit 37 and the light source control unit 37 controls the light source portion 12 to irradiate light.

Figure 7:
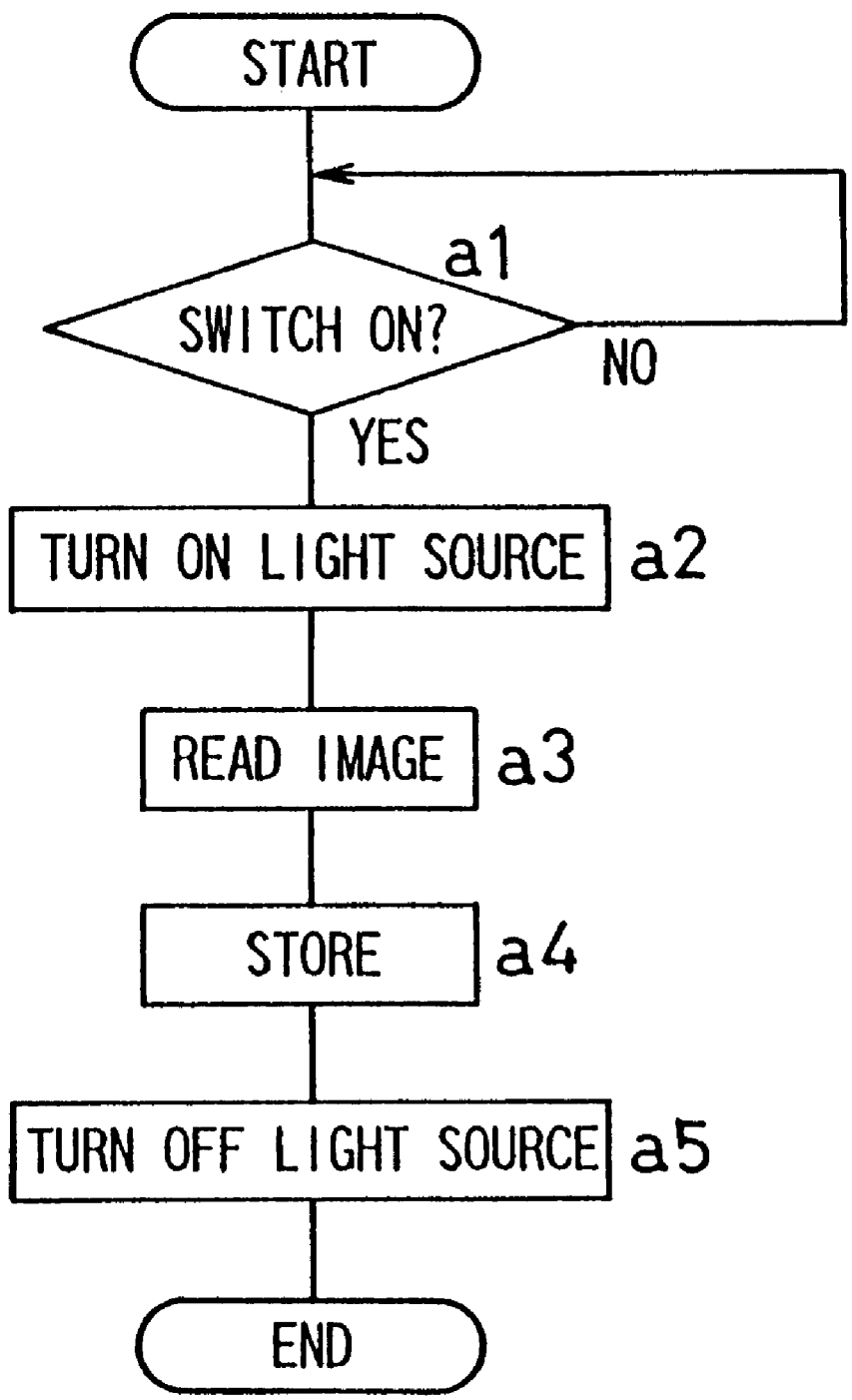
FIG. 7 is a flowchart showing image reading operation of the image reading and displaying apparatus 1.

FIG. 7 is a flowchart showing image reading operation of the image reading and displaying apparatus 1 when the light source portion 12 is used. At step a1, whether the light irradiation switch 39 is pushed down to turn on is determined, when the turning on is determined, the light source portion 12 is turned on at step a2. At step a3, an image is read by the scanner 17. The image reading operation may be started in response to the pushing down of the read start button 8 by the light source portion 12 or may be started in response to the pushing down of the light irradiation switch 39. At step a4, read image information is stored in RAM 46. At step a5, image reading is finished and the light source portion 12 is turned off.

In this way, when, for example, the amount of external light is weak, an image can be read by using the light source portion 12. Further, when a sufficient amount of external light without needing the light source portion 12 is provided, the light source portion 12 is moved to open the read face 17a, the opened read face 17a is directed toward a document and an image is read by pushing down the read start button 8.

In this way, image information read by the scanner 17 is stored to RAM 46. The rear face 15b of the display device 15 and the rear face 17b of the scanner 17 are arranged to be brought into contact with each other and therefore, an image drawn on a document can be visually observed via the scanner 17, the display device 15 and the tablet 14. That is, the display device 15 is of a light transmitting type and the tablet 14 has light transmitting performance and accordingly, an image is observable. Further, an image is observable from intermediaries among the photocells 57 at the scanner 17, and accordingly, an operator can confirm an image to be read whereby the image can be read with certainly.

Further, light display of a light transmitting type can be produced by arranging the light source portion 12 on the side of the read face 17a and irradiating from the light source portion 12 toward the side of the display face 15a. Meanwhile, when light is not irradiated from the light source portion 12, display of a light reflecting type using external light can be achieved. An image can be read by moving the light source portion 12 to open the read face 17a and making external light reflect by the surface of a document and making reflected light incident on the scanner 17. When the external light amount is weak, an image can be read by arranging the light source portion 12 on the side of the input display face 7 and irradiating light toward the side of the read face 17a whereby light from the light source portion 12 is reflected by the surface of a document and the reflected light is made incident on the scanner 17. Accordingly, the light source portion 12 can be used both in display and reading.

Further, the display face 15a and the read face 17a are selected to have substantially the same size thereby constituting the light source portion 12 by a planar light source having a light emitting face with a size substantially the same as those of the faces 15a and 17a thereof whereby uniformity of brightness in the display face and uniformity of in-plane darkness in reading can be promoted.

When the arrangement of the light source portion 12 on the side of the display face 15a is detected by the switch 39, the light source portion 12 is turned on. Accordingly, the light source portion 12 can be turned on with certainty when an image is read by utilizing light from the light source and power consumption can be reduced since the light source portion 12 is not turned on so far as it is not arranged on the side of the display face 15a.

Figure 8A:
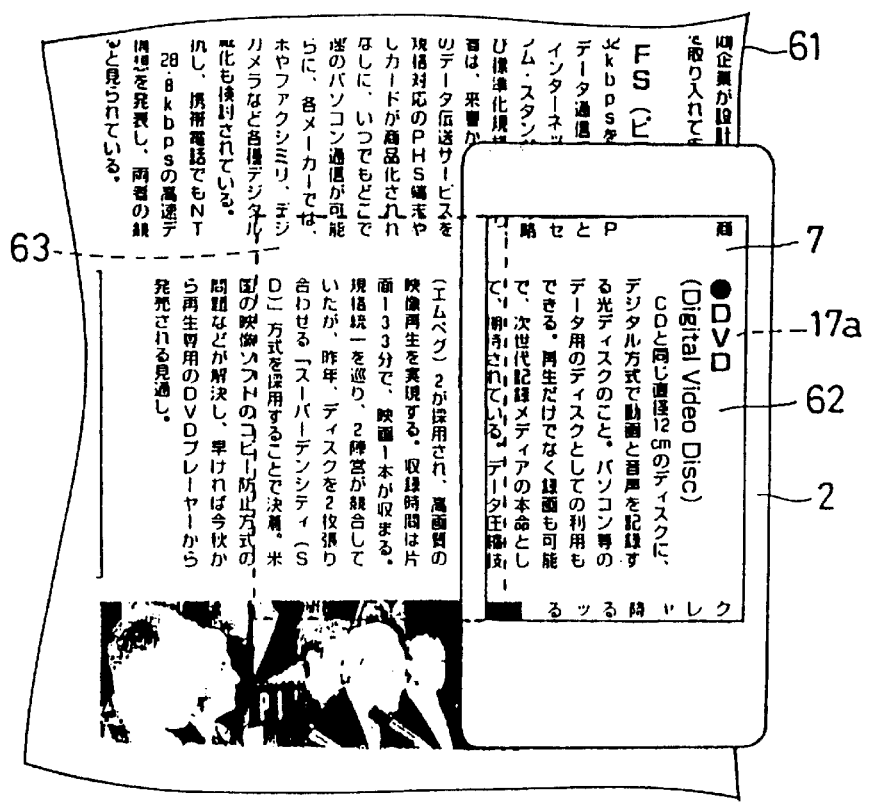
FIGS. 8A through 8C are plane views for explaining the operation of reading an image having a large area by continuously connecting portions of the image by using the image reading and displaying apparatus 1.
Figure 8B:
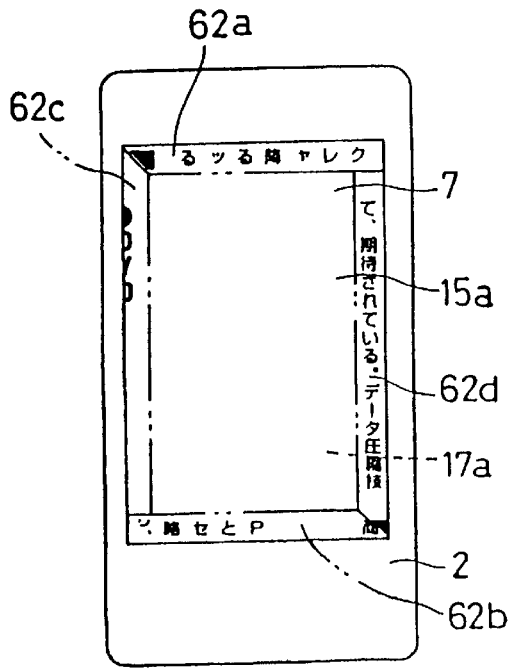
Figure 8C:
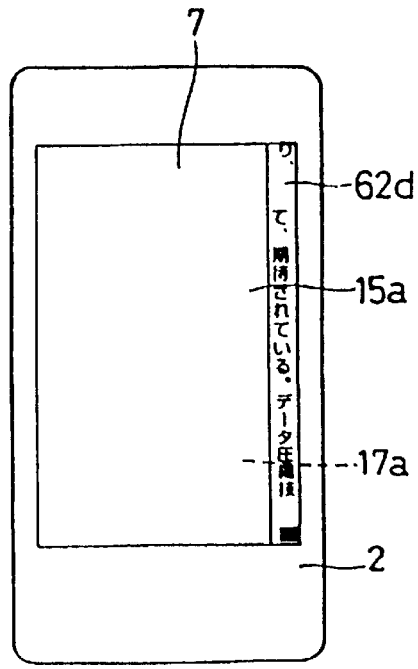

Next, an explanation will be given of the operation when portions of an image having a large area are connected together and read by using the image reading and displaying apparatus 1. FIG. 8A through FIG. 8C are plane views for explaining the operation. A region where an image to be read of a document 61 is provided with an area larger than the read face 17a of the image reading and displaying apparatus 1. In this case, the image is read by being divided into a plurality of regions. Here, assume that a first region 62 and a second region 63 contiguous to the left side of the first region 62 on the drawing shown by FIG. 8A are connected together and read.

First, the read face 17a is arranged to the first region 62 and an image of the region 62 is read. Next, an image of the second region 63 is read. An image of one end in the image of the first region 62 which has been previously read, is displayed at another end opposed to the one end. That is, an image of an upper end is displayed at a lower end and an image of the lower end is displayed at the upper end, an image of a left end is displayed at a right end and an image of the right end is displayed at the left end. As shown by FIG. 8B, in this way, the images of the lower end, the upper end, the right end and the left end among the read images are displayed respectively at an upper region 62a, a lower region 62b, a left region 62c and a right region 62d of the display face 15a.

The read face 17a of the image reading and displaying apparatus 1 having performed such a display, is arranged to the second region 63. In this case, an operator can arrange the read face 17 after positioning the read face 17 such that the images displayed by the respective regions 62a through 62d of the display face 15a coincide with the image of the second region 63 whereby an image having a large area can easily be read.

Incidentally, the upper and the lower regions 62a and 62b are selected to have a size to a degree capable of displaying one letter in the row direction and the left and the right regions 62c and 62d are selected to have a size to the degree capable of displaying one letter in the column direction orthogonal to the row direction where, for example, the former is selected to have a size of 5 through 10 dots in the row direction and the latter is selected to have the size of 5 through 10 dots in the column direction.

Figure 9:
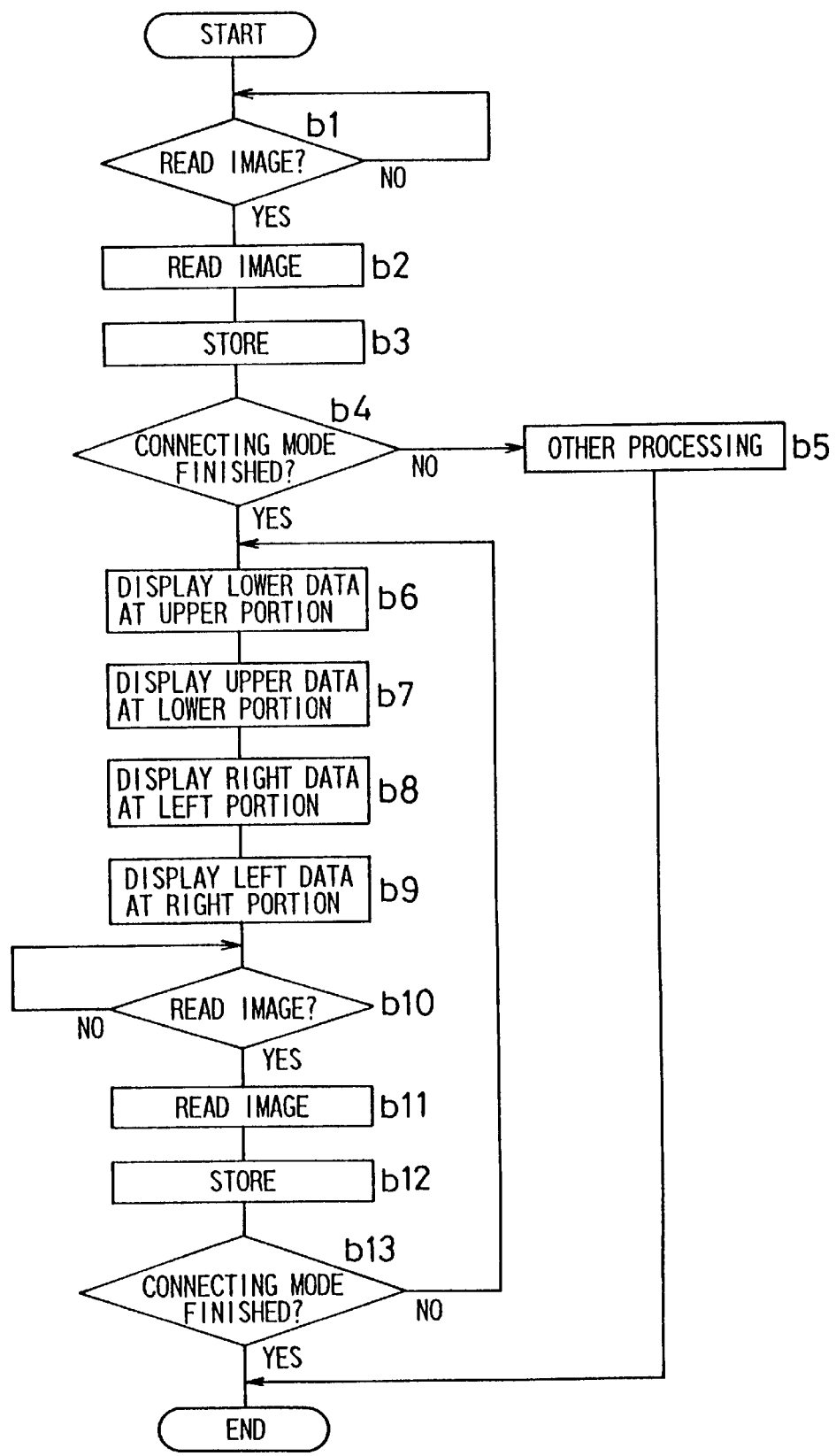
FIG. 9 is a flowchart showing the operation of reading the image having a large area by continuously connecting portions thereof by using the image reading and displaying apparatus 1.

FIG. 9 is a flowchart showing the operation when an image having a large area is read by connecting together regions thereof. At step b1, whether start of reading an image is instructed is determined. When it is determined that the start is instructed, the image is read at step b2 and image information read at step b3 is stored. At step b4, whether the operation is in a mode of connecting regions of an image is determined. When it is determined that the operation is in the connecting mode, the operation executes processing at step b6 and thereafter and when it is determined that the operation is not in the connecting mode, the operation proceeds to step b5 and executes other processing whereby the reading operation is finished. The connecting mode is designated, for example, by pushing down the mode button 29.

At step b6, an image at an upper end among read images is displayed at the lower end. At step b7, an image at the lower end is displayed at the upper end. At step b8, an image at the left end is displayed at the right end. At step b9, an image at the right end is displayed at the left end. At step b10, whether start of reading an image is instructed is determined. When it is determined that the start is instructed, the image is read at step b11 and read image information is stored at step b12. At step b13, whether the mode of connecting regions of the image has been finished is determined, when the finishing of the mode is determined, the reading operation is finished and when it is determined that the connecting mode has not been finished, the operation returns to step b6. The finishing of the connecting mode is designated by pushing down the mode button 29.

In this way, an image having a large area can be read easily by arranging the read face to position to the document such that an image contiguous to a read image is connected continuously to an image displayed at an end of the display face.

Further, the image reading and displaying apparatus 1 can designate either one of images of the upper end, the lower end, the left end and the right end by using the cursor button 9 and can display the image of the designated end to an end opposed to the designated end. For example, as shown by FIG. 8C, an image at the left end among read images is displayed at the right region 62d of the display face 15a.

The read face 17a of the image reading and displaying apparatus 1 having performed such a display is arranged to the second region 63 and an operator can arrange the read face 17 to position the read face 17 such that the image displayed at the region 62d of the display face 15a coincides with the image of the second region 63 whereby an image having a large area can easily be read.

Figure 10:
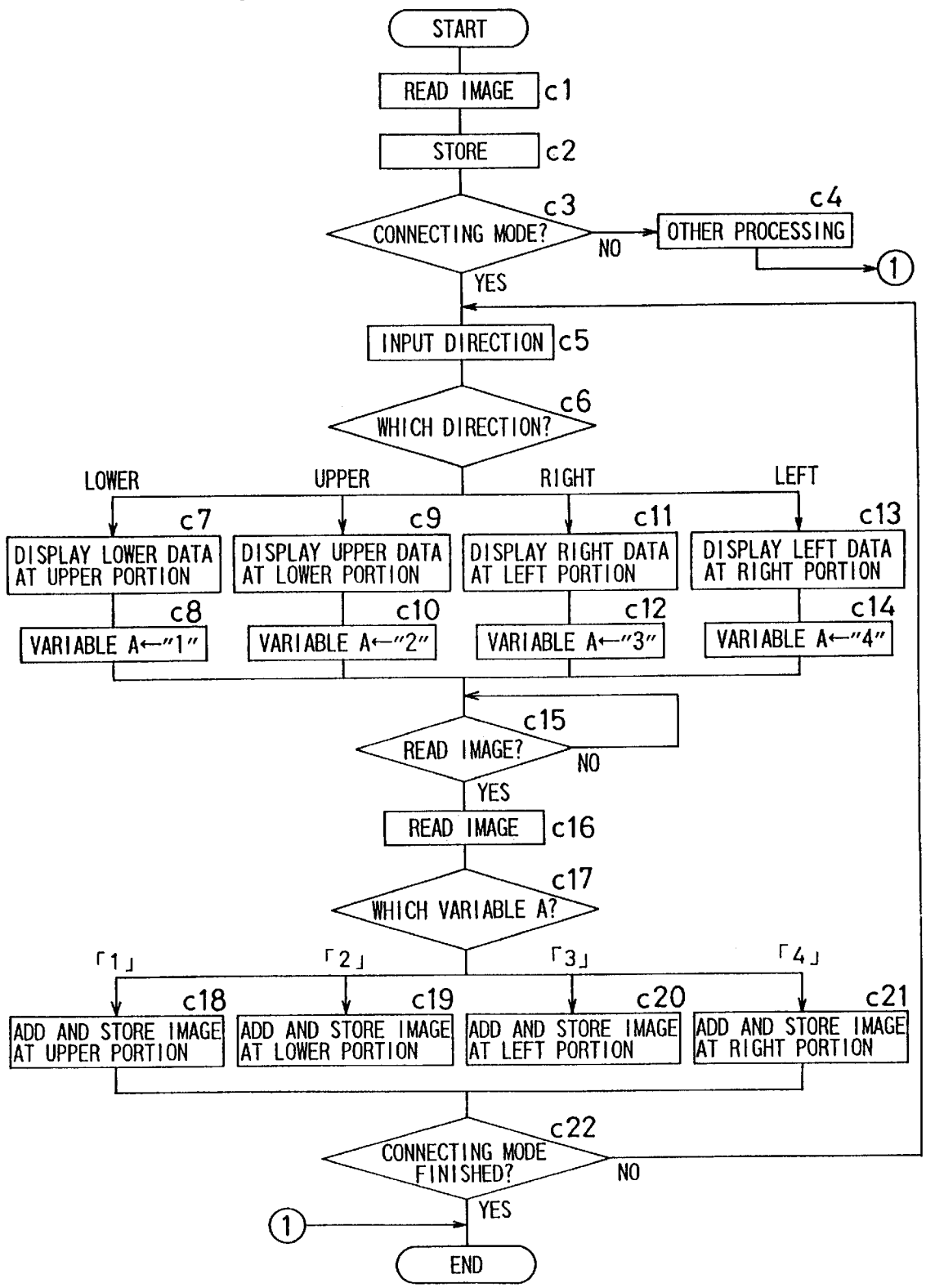
FIG. 10 is a flowchart for showing other operation in reading the image having a large area by continuously connecting portions thereof by using the image reading and displaying apparatus 1.

FIG. 10 is a flowchart showing other operation in reading an image having a large area by continuously connecting regions of image by using the image reading and displaying apparatus 1. At step c1, an image is read in response to an instruction of starting to read the image and at step c2 image information is stored. At step c3, whether the operation is in the mode of connecting images is determined. When it is determined that the operation is in the connecting mode, the operation executes processing at step c5 and later steps and when it is determined that the operation is not in the connecting mode, the operation proceeds to step c4 where other processing is executed by which the reading operation is finished.

At step c5, the direction of connection is instructed by using the cursor button 9. At step c6, which of upper, lower, left and right directions is the instructed direction is determined. In the case of the lower direction, the operation proceeds to step c7 where an image of the lower end is displayed at an upper end and "1" is stored as the direction determining variable A at step c8. In the case of the upper direction, the operation proceeds to step c9 where an image of the upper end is displayed at the lower end and "2" is stored as the direction determining variable A at step c10. In the case of the right direction, the operation proceeds to step c11 where an image at the right end is displayed at the left end and "3" is stored as the direction determining variable A at step c12. In the case of the left direction, the operation proceeds to step c13 where an image at the left end is displayed at the right end and "4" is stored as the direction determining variable A at the step c14.

At step c15 where the processing at steps c8, c10, c12 and c14 has been finished, whether an instruction of starting to read an image is determined. When it is determined that the start has been instructed, the image is read at step c16. At step c17, what is the value of the direction determining variable A is determined. In the case of "1", the operation proceeds to step c18 where the image read at step c16 is added and stored at the upper end of the image stored at step c2. In the case of "2", the operation proceeds to step c19 where the image read at step c16 is added an stored at the lower end of the image stored at step c2. In the case of "3", the operation proceeds to step c20 where the image read at step c16 is added and stored at the left end of the image stored at step c2. In the case of "4", the operation proceeds to step c21, where the image read at step c16 is added and stored at the right end of the image stored at step c2.

At step c22, where the processing of the step c18 through c21 have been finished, whether the mode of continuously connecting images has been finished is determined. When it is determined to finish, the reading operation is finished and when the connecting mode is determined not to be finished, the operation returns to step c5.

When an image having a large area is read by connecting together regions thereof in this way, the read face is arranged to position to the document such that an image contiguous to an end of a read image that is designated by the cursor button 9, is connected continuously to an image displayed at an end of the display face and an end to be connected is designated in this way, whereby the image having a large area can easily be read.

Figure 11:
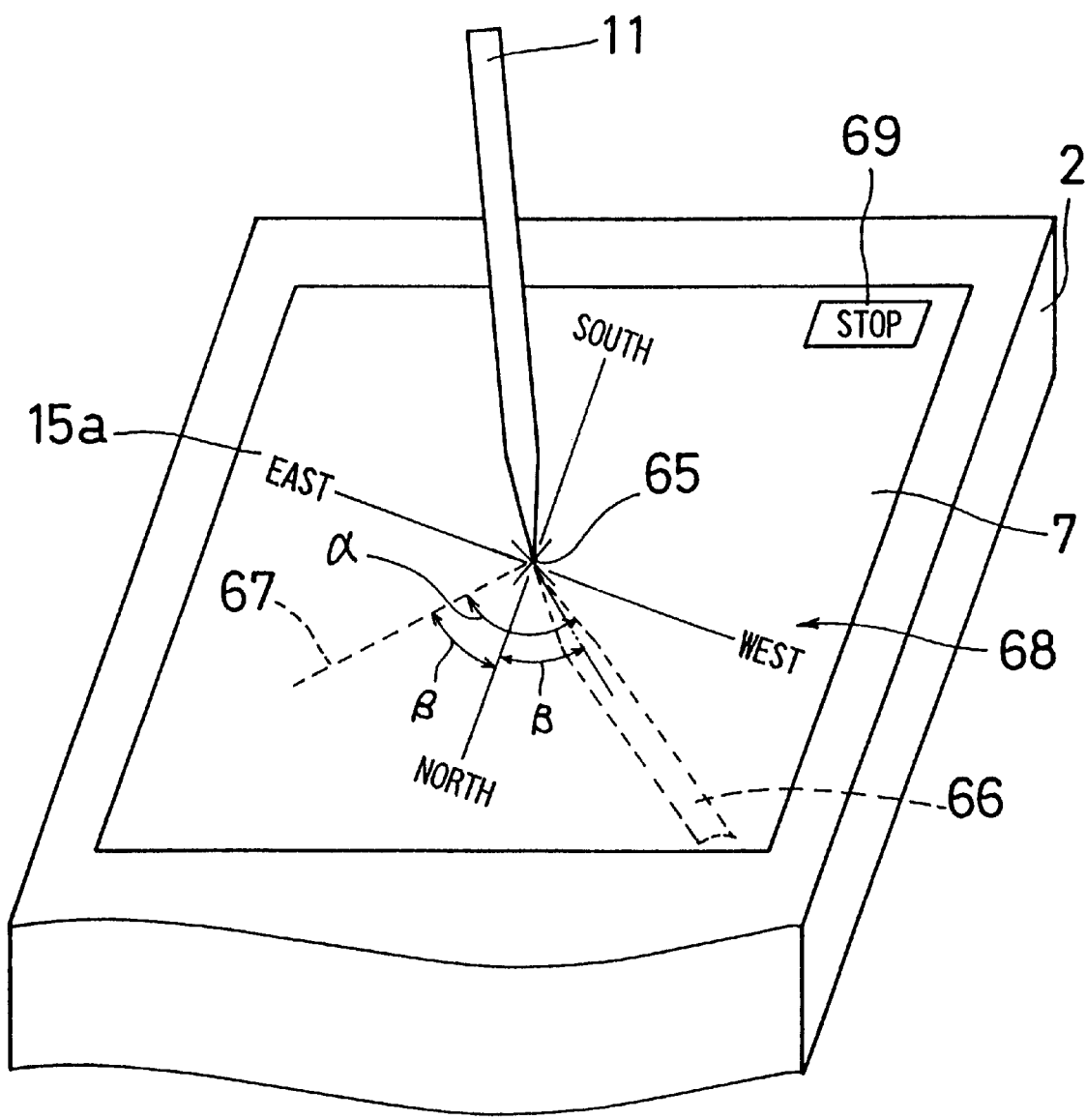
FIG. 11 is a perspective view showing an input display face 7 for explaining the operation in providing a direction.

An explanation will finally be given of the operation in providing a direction. FIG. 11 is a perspective view showing the input display face 7 for displaying the operation. A reference point 65 is previously set at substantially central portions of the input display face 7 and the read face 17a and an analog clock is set. Here, an analog clock where a short hand pivots twice a day is set. Further, the light source portion 12 is turned off and light as a back light is not irradiated.

When the input pen 11 is erected at the reference point 65 orthogonally to the input display face 7, a shadow 66 is formed on the input display face 7. The shadow 66 is also imaged on the side of the read face 17a via the tablet 14, the display device 15 and the scanner 17 and accordingly, the scanner 17 can read it. Meanwhile, measured current time is read by RTC 40. Assume twelve o'clock direction with position of the shadow 66 as the direction of the short hand at current time. For example, when the current time is nine o'clock, an imaginary twelve o'clock direction 67 is provided. Further, the position at an angle β that is a half of an angle α made by the shadow 66 and the twelve o'clock direction 67, indicates the direction of "north". Based on the direction of "north", directions of "east", "west" and "south" are derived based on the direction of "north" and a FIG. 68 showing the respective directions is displayed.

Figure 12:
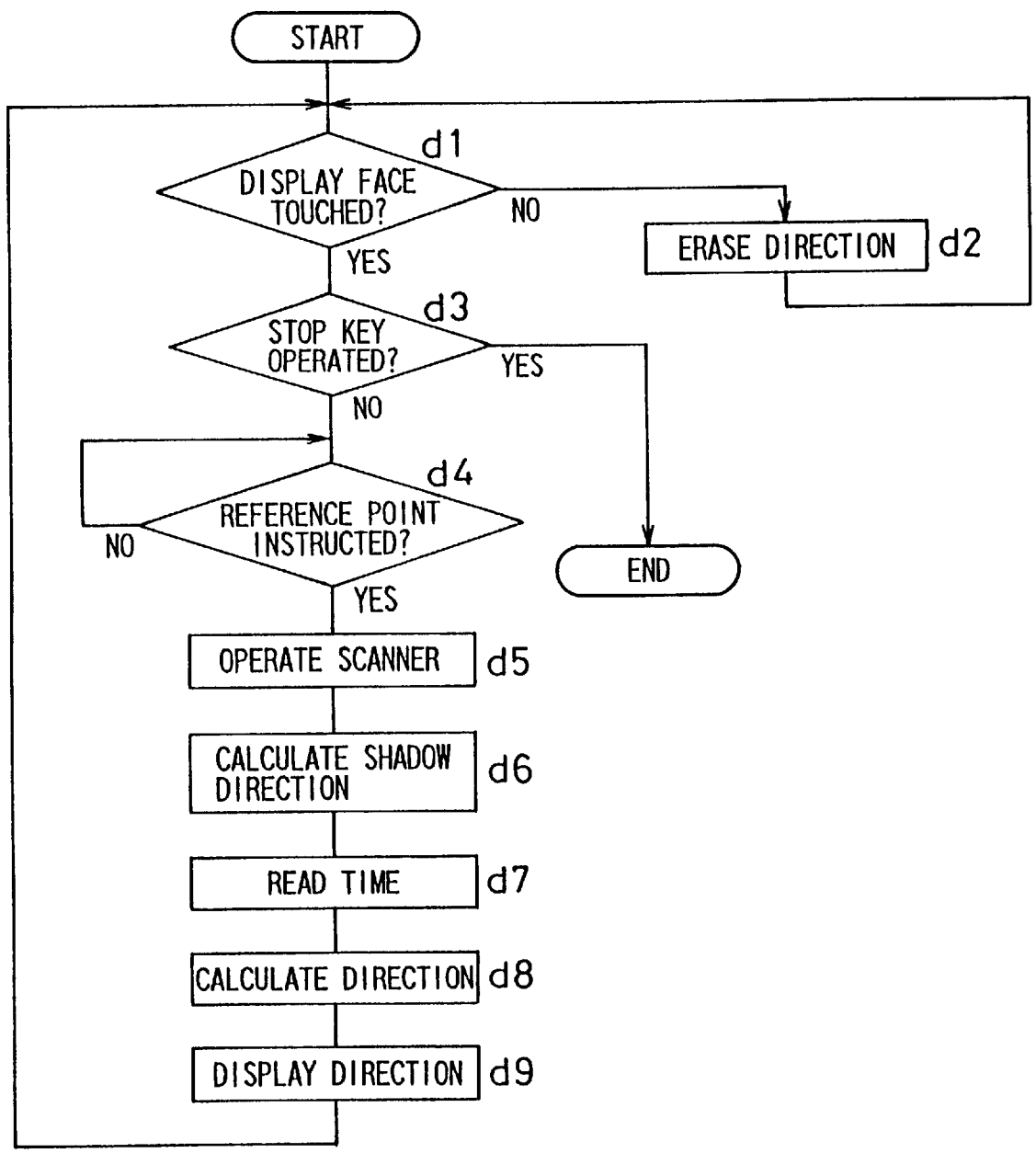
FIG. 12 is a flowchart showing the operation in providing a direction.

FIG. 12 is a flowchart showing the operation providing the directions. At step d1, whether an instruction is issued by touching the input display face 7 by the input pen 11 is determined. At step d3 after the determination of touch, whether a stop key 69 on the input display face 7 is instructed is determined. When it is determined that the stop key 69 has been operated, the processing is finished and when the stop key 69 is not determined to push down, the operation proceeds to step d4.

At step d4, whether the reference point 65 is instructed is determined and when the reference point 65 is instructed, the scanner 17 is operated at step d5 whereby the shadow 66 is read. The position of the shadow 66 is calculated at step d6, the current time is read at step d7, the direction is calculated at step d8 and the FIG. 68 is displayed at step d9. When the processing at step d9 is finished, the operation returns to step d1.

When it is determined that the input pen 11 is not operated to touch at step d1, the operation proceeds to step d2 where the displayed FIG. 68 is erased and the operation returns to step d1.

Function as a direction magnet is added in this way whereby the photocells can effectively be utilized other than in reading an image. Further, for example, when the input pen 11 is pushed down at the reference point 65, that is, when it is designated, a necessary direction can accurately be indicated by displaying the provided direction.

Incidentally, by providing a change-over switch for switching a north hemisphere and a south hemisphere, they may be constituted such that it can be used worldwide. Further, an analog clock where the short hand pivots once a day may be set on the input display face 7 and the read face 17a and in this case the twelve o'clock direction 67 indicates "north".

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image reading and displaying apparatus comprising:
    reading means having a reading portion in which photocells are arranged in a matrix form, for reading an image of a document arranged on a side of a reading face of the reading portion, to output image data;
    storing means for storing the image data from the reading means;
    displaying means of a light transmitting type having a display face for displaying the image data stored in the storing means, the displaying means being arranged such that a back face of the display face contacts a back face of the reading face;
    wherein a light source for optically irradiating the displaying means is detachably arranged on the side of the reading face of the reading means;

wherein the light source is arranged movably to the side of the display face of the displaying means so that light can be irradiated from the back face of the reading means;

detecting means for detecting that the light source is arranged on the side of the display face and turn on of the light source is designated; and light source controlling means for controlling a time period of turning on the light source in response to an output from the detecting means.

2. The image reading and displaying apparatus of claim 1, wherein the display face and the reading face have substantially the same size and the light source is a planar light source having a light emitting face substantially having the same size as that of the display face and the reading face.

3. An image reading and displaying apparatus comprising:

reading means having a reading portion in which photocells are arranged in a matrix form, for reading an image of a document arranged on a side of a reading face of the reading portion, to output image data;

storing means for storing the image data from the reading means;

displaying means of a light transmitting type having a display face for displaying the image data stored in the storing means, the displaying means being arranged such that a back face of the display face contacts a back face of the reading face;

first designating means for designating that an image of a document larger than the reading face is divided into a plurality of regions to be read; and display controlling means in response to an output from the first designating means for editing the image data stored in the storing means to provide the image data to the displaying means so that an image of one end in one region read by the reading means is displayed at another end opposed to the one end;

wherein the image reading and displaying apparatus or the document is moved such that the image of the document is continuously connected to the image displayed on the display face to read an image of the region adjacent to the region read by the reading means.

4. The image reading and displaying apparatus of claim 3, further comprising:

second designating means for designating an end of the region read by the reading means to which end a portion of the image of the document is to be continuously connected, wherein the display controlling means edits the image data stored in the storing means to provides the image data to the displaying means such that an image at the end designated by the second designating means, of the region read by the reading means, is displayed at another end opposed to the end designated by the second designating means, in response to an output from the first designating means.

5. An image reading and displaying apparatus comprising:

reading means having a reading portion in which photocells are arranged in a matrix form, for reading an image of a document arranged on a side of a reading face of the reading portion, to output image data;

storing means for storing the image data from the reading means;

displaying means of a light transmitting type having a display face for displaying the image data stored in the storing means, the displaying means being arranged such that a back face of the display face contacts a back face of the reading face;

a rod-like member erectable orthogonally to a center portion of the display face;

time measuring means for measuring time; and direction providing means wherein a shadow formed on the display face in erecting the rod-like member orthogonally to the center portion of the display face, is read by the reading means and a direction is provided from a position of the shadow in a face with a reference of the center portion of the display face and time measured by the time measuring means when the shadow is ready;

wherein the displaying means displays the direction provided by the direction providing means on the display face.

6. The image reading and displaying apparatus of claim 5, further comprising:

third designating means for designating display of the direction provided by the direction providing means, wherein the displaying means displays the provided direction in response to an output from the third designating means.

7. An imaging apparatus comprising:

a light transmissive display screen;

a scanner which generates electronic signals representing an image to which a read face of the scanner is exposed;

a housing for situating the display screen and the scanner in adjoining relationship; and a light source movably attached to the housing for selectively supplying light during a scanning operation;

wherein the light source is movable from a first orientation to a second orientation, and wherein in the second orientation the display screen is intermediate the light source and the scanner whereby light supplied by the light source radiates through the display screen for use in the scanning operation.

8. The apparatus of claim 7, wherein in the first orientation the light source lies essentially parallel to the read face of the scanner.

9. The apparatus of claim 7, wherein housing has a groove along which the light source slides and pivots from a first orientation to a second orientation.

10. An imaging apparatus comprising:

a light transmissive display screen;

a scanner which generates electronic signals representing an image to which a read face of the scanner is exposed;

a housing for situating the display screen and the scanner in adjoining relationship;

a light source movably attached to the housing for selectively supplying light during a scanning operation;

wherein the housing has a light irradiation switch which activates a light of the light source when the light irradiation switch is contacted by the light source;

wherein the light source is movable from a first orientation to a second orientation, and wherein the light irradiation switch activates the light of the light source when the light source is in the second orientation; and wherein in the second orientation the display screen is intermediate the light source and the scanner whereby light supplied by the light source radiates through the display screen for use in the scanning operation.

11. An imaging apparatus comprising:

a display screen;

a scanner which generates electronic signals representing an image to which a read face of the scanner is exposed;

a controller which coordinates the display screen and the scanner in a process of scanning an input image larger than the read face whereby, when a first section of the input image has been scanned and an adjoining second section of the input image is about to be scanned, the display screen displays a portion of the first section so that the second section of the input image can be positioned in the scanner.

12. The apparatus of claim 11, wherein the display screen is light transmissive, and wherein the apparatus further comprises a housing for situating the display screen and the scanner in adjoining relationship whereby at least a part of the input image can be viewed through the display screen.

13. The apparatus of claim 11, wherein the display screen displays an edge of the first section of the input image.

14. The apparatus of claim 11, wherein the display screen displays selectively displays ones of plural edges of the first section of the input image.

15. An imaging apparatus comprising:

a display screen;

a scanner;

a housing for situating the display screen and the scanner in adjoining relationship;

a controller which coordinates the display screen and the scanner in a direction indication process whereby, when a predetermined instrument is positioned on the display screen, the scanner senses a shadow of the predetermined instrument and generates scanner output signals, the scanner output signals being is used by the controller to determines at least one compass direction for display on the display screen.

16. The apparatus of claim 15, further comprising a clock which provides a current time parameter utilized by the controller to determine the at least one compass direction.

17. The apparatus of claim 15, wherein the controller determines a compass north direction and derives therefrom at least one another compass direction for display on the display screen.

18. The apparatus of claim 15, wherein the display screen is light transmissive, and wherein the housing situates the display screen and the scanner whereby the shadow is perceptible by the scanner through the light transmissive display screen.

* * * * *